United States Patent
Yoshimura et al.

(10) Patent No.: US 6,497,759 B1
(45) Date of Patent: Dec. 24, 2002

(54) SCRATCH INK COMPOSITION AND WRITING UTENSIL CONTAINING THE SAME

(75) Inventors: Yasuyuki Yoshimura, Ibaragi (JP); Naoshi Murata, Higashiosaka (JP); Yuki Yamamoto, Yamatokoriyama (JP)

(73) Assignee: Sakura Color Products Corp., Osaka (JP)

( * ) Notice: Subject to any disclaimer, the term of this patent is extended or adjusted under 35 U.S.C. 154(b) by 137 days.

(21) Appl. No.: 09/664,253

(22) Filed: Sep. 18, 2000

(30) Foreign Application Priority Data

Sep. 17, 1999 (JP) ............................................ 11-262918

(51) Int. Cl.⁷ .......................... C09D 11/00; C09D 11/16
(52) U.S. Cl. ................. 106/31.65; 106/31.68; 106/31.7
(58) Field of Search .......................... 106/31.65, 31.68, 106/31.7, 499, 501.1

(56) References Cited

U.S. PATENT DOCUMENTS

| | | | | |
|---|---|---|---|---|
| 5,215,576 A | * | 6/1993 | Carrick | 106/31.01 |
| 5,544,881 A | * | 8/1996 | Rua et al. | 273/139 |
| 5,667,250 A | * | 9/1997 | Behm et al. | 283/102 |
| 5,925,440 A | * | 7/1999 | Farag et al. | 273/139 |
| 6,160,046 A | * | 12/2000 | Bleikolm et al. | 524/284 |

* cited by examiner

*Primary Examiner*—Helene Klemanski
(74) *Attorney, Agent, or Firm*—Howard C. Miskin, Esq.; Gloria Tsui-Yip, Esq.

(57) ABSTRACT

The invention is directed to a scratch ink composition improved in erasability, hiding power and ease of use. The invention relates to a scratch ink composition comprising a flaky pigment having a particle size distribution (as determined with a laser diffraction particle size distribution analyzer) such that the integral fraction of particles not larger than 10 $\mu$m in diameter is not more than 30%, a resin component, and a solvent.

12 Claims, No Drawings

SCRATCH INK COMPOSITION AND WRITING UTENSIL CONTAINING THE SAME

FIELD OF THE INVENTION

The present invention relates to a novel scratch ink composition and a writing utensil utilizing the composition.

BACKGROUND OF THE INVENTION

The scratch ink is a kind of ink adapted to form an opaque film capable of hiding the character, numeral, symbol and/or other pattern image on a substrate for use in the field of lottery and game tickets or the like and removable by scratching with a coin edge, a fingernail or a rubber eraser.

With regard to the printed matter embodying such a function, there is known the artifact produced by forming a desired image, such as a drawing, characters, figures or a photograph, by printing on the surface of a substrate, such as a paper or plastic sheet, applying a wax-formulated solution of a medium composed of a resin, a vegetable oil, a petroleum-based solvent and a desiccant over the image area to form a medium layer, and forming an opaque image (layer) capable of hiding the first-mentioned image by printing over said medium layer either locally or all over so that when the surface of the artifact is abraded or scratched the printing ink forming said opaque image is dislodged to reveal the underlying printed image (Japanese Examined Utility Model Publication S44-12094).

However, to produce such a printed matter, it is necessary to form a medium layer on the printed character, figure or the like image in the first place and then form an opaque layer, so that the method can hardly be said to be expedient. Particularly because it is intended for the production of printed matter, the method is unsuited for gimmicks to be enjoyed personally or at the family level.

There also is known an ink composition compatible with paper such that the characters or pattern written on a paper substrate can be erased with a rubber eraser or the like characterized by its comprising a uniform pigment dispersion prepared by dispersing a pigment selected from the group consisting of carbon black and aniline black in an aqueous medium containing a high molecular polyethylene oxide, optionally with the aid of a surfactant, and containing 1~20 weight % of said pigment and 0.01~5 weight % of said high molecular polyethylene oxide (Japanese Examined Patent Publication H1-39470).

However, the film formed from this ink composition is hardly removable with a rubber eraser or the like at times and the composition remains to be further improved in erasability.

There also is available an erasable ink characterized by its comprising a resin having a film-forming temperature of not higher than 0° C. or a glass transition temperature of not higher than 0° C., a colored powder consisting of fine spherical particles ranging from 1 to 20μ in diameter, and water and having an ink viscosity of 5~35 mPa·sec (Japanese Unexamined Patent Publication H5-279614).

Though this ink is erasable, it inherently has no covering power so that characters or other patterns cannot be hidden. Therefore, the ink cannot be used as a scratch ink which is intrinsically expected to hide character, pattern or other images. On the other hand, if an attempt is made to impart a covering power to this ink, chances are that its erasability will be sacrificed.

Thus, these known inks are invariably deficient in one or more of the performance quality parameters of erasability, hiding power and ease of use, and up to the present there has not been available an ink satisfying all the requirements, that is to say an ink suited for erasable applications.

An object of the present invention is to provide a scratch ink composition improved in erasability, hiding power and ease of use.

SUMMARY OF THE INVENTION

After an intensive research to overcome the above disadvantages of the prior art, the present inventor found that an ink composition having the herein-defined composition accomplishes the above object and has accordingly developed the present invention.

The present invention, therefore, is directed to the following scratch ink compositions and a writing utensil which utilizes the same.

1. A scratch ink composition comprising a flaky pigment, a resin component and a solvent, the particles of the pigment having a particle size distribution (as determined with a laser diffraction particle size analyzer) such that the integral fraction of particles not larger than 10 μm in diameter is not more than 30%.

2. A scratch ink composition as defined in the above paragraph 1 wherein the particles constituting an integral fraction of 30% in particle size distribution (as determined with a laser diffraction particle size analyzer) are 3~200 μm in diameter and that its thickness is ⅟₄₀~⅟₆₀ of the particle diameter.

3. A writing utensil comprising the composition defined in the above paragraph 1 or 2 as its ink component.

4. A scratch material comprising a film formed from the composition defined in the above paragraph 1 or 2 on a substrate carrying a character or pattern image, said film hiding said character or pattern image.

5. A method of producing a scratch material which comprises printing a substrate with a character or pattern image and then applying the composition defined in the above paragraph 1 or 2 in superimposition to hide said character or pattern image.

DETAILED DESCRIPTION OF THE INVENTION

1. Scratch Ink Composition

Referring, first, to the flaky pigment for use in the composition of the present invention, its particle size distribution (as determined with a laser diffraction particle size analyzer) should be such that the integral fraction of particles not larger than 10 μm is not more than 30% (preferably not more than 20%). Inasmuch as this condition is satisfied, any commercial pigment can be used as it is.

Even the pigment which fails to satisfy the above condition can be used as the pigment in the present invention by eliminating or reducing the proportion of particles not larger than 10 μm by the known fractionation technique such as centrifugation, filtration or addition of a flocculant or, where necessary, adding particles over 10 μm in diameter.

The particle morphology of the flaky pigment is not particularly restricted inasmuch as the desired hiding power can be attained but may usually be such that the particle diameter (referred to also as $D_{30}$) corresponding to an integral fraction of 30% ($D_{30}$) in particle size distribution (as determined with a laser diffraction particle size distribution analyzer) is about 3~200 μm, preferably 15~50 μm. Moreover, the thickness of the flaky pigment may be ⅟₄₀~⅟₆₀, preferably about ⅟₅₀, of the $D_{30}$ value.

The flaky pigment (raw material) is not restricted inasmuch as it provides the desired hiding power and may be an organic pigment or an inorganic pigment (inclusive of a metal powder pigment). For example, an aluminum powder pigment or a metal-coated inorganic pigment (e.g. the pigment obtained by covering glass flakes with a metallic film by a suitable coating technique such as electroless plating or sputtering; the pigment obtained by covering an inorganic or metallic material, e.g. mica or aluminum, with a metallic film by a suitable coating technique; etc.) can be mentioned. These pigments can be used independently or in a suitable combination.

As the flaky pigment, commercial products can also be used. To mention a few examples, the aluminum powder pigment includes "Alpaste WXM-U75C", "Alpaste WXM5422" and "Alpaste WXM1440" (all from Toyo Aluminum Co.); the pigment obtained by covering glass flakes with a metallic film by electroless plating (metal-coated inorganic pigment) includes "Metashine REFSX-2015PS", "Metashine REFSX-2025P" and "Metashine REFSX-2040PS" (all from Toyo Aluminum Co.); and the pigment obtained by covering glass flakes with a metallic film by sputtering (metal-coated inorganic pigment) includes "Crystal Color GF2125", "Crystal Color GF2525", "Crystal Color GF2140" and "Crystal Color GF2125" (all from Toyo Aluminum Co.).

The proportion of flaky pigment (on a solid basis) can be judiciously selected according to its kind and may be generally about 3~30 weight %, preferably 4~15 weight %, based on the total composition of the present invention. When the proportion of the flaky pigment is too small, a sufficient hiding power may not be obtained. When it is excessive, the increased solid content tends to lower the fluidity of the composition.

The resin component is not particularly restricted inasmuch as it can be used for viscosity adjustment of the ink composition and is capable of forming an opaque film over a written or printed image, thus including water-soluble resins and oil-soluble resins. As such water-soluble resins, there can be mentioned microbial secretion polysaccharides such as pullulan, xanthan gum, welan gum, rhamsan gum, succinoglucan, etc.; plant-derived water-soluble polysaccharides or derivatives thereof, such as guar gum, locust bean gum, pectin, etc.; animal-derived water-soluble polysaccharides or proteins and derivatives thereof, such as gelatin, casein, etc.; cellulose derivatives such as hydroxyethylcellulose, carboxymethylcellulose (CMC), etc.; cyclodextrins and derivatives thereof, such as α-cyclodextrin, β-cyclodextrin, γ-cyclodextrin, and methyl or other derivatives thereof; soybean-derived water-soluble polysaccharides or derivatives thereof which are available from commercial sources under the tradenames of e.g. "Soya Five S-DN", "Soya Five S-LN", "Soya Five S-LN1", "Soya Five S-DA100" and "Soya Five S-LA200" (all from Fuji Oil Company); and synthetic water-soluble resins such as acrylic resin, styrene-acrylic resin, styrenic resin, maleic acid resin, styrene-maleic acid resin, polyvinylpyrrolidone, urethane resin, polyvinyl alcohol (PVA) and so on. The oil-soluble resins are not particularly restricted, either, inasmuch as they are soluble in the solvent component of the composition of the present invention, thus including ketonic resins, phenolic resins and xylenic resins, among others. These resins can be used independently or in a combination of 2 or more species.

Among these resin components, the water-soluble resin is preferably a resin containing a microbial secretion polysaccharide or a derivative thereof as an essential component (particularly a resin comprising a microbial secretion polysaccharide or a derivative thereof and PVA). The microbial secretion (metabolite) polysaccharide inclusive of their derivatives are preferred because they impart thixotropy to the ink and provide for improved writing quality. The preferred species of said oil-soluble resin is a resin system comprising at least one member selected from the group consisting of ketonic resin, phenolic resin and xylenic resin.

The proportion of the resin component can be judiciously selected according to the kind of resin, the kind of solvent, etc. and may for example be generally about 0.01~30 weight %, preferably 0.3~20 weight %, based on the total composition of the present invention. When the resin content is too high, the increased viscosity tends to detract from writing or printing quality. When the resin content is too low, the flaky pigment tends to be precipitated.

The solvent is not particularly restricted but may be any solvent that is generally used. Thus, for example, water, alcohols such as methanol, ethanol, propanol, butanol, etc.; glycols such as ethylene glycol, diethylene glycol, propylene glycol, etc.; glycol ethers such as ethylene glycol monomethyl ether, propylene glycol monomethyl ether, and carbitols such as diethylene glycol monomethyl ether can be mentioned. Furthermore, glycerin, trimethylolpropane, etc. can also be employed. Among these, water, aliphatic alcohols containing 1~4 carbon atoms, propylene glycol monomethyl ether and glycerin are preferred. These solvents can be used independently or two or more of them can be used in a suitable combination.

The proportion of the solvent can be judiciously selected according to the kind of flaky pigment used and may for example be generally about 50~90 weight %, preferably 60~90 weight %, based on the total composition of the present invention. When the amount of the solvent is too large, the concentration (density) of the written or printed image tends to be insufficient. Conversely when the amount of the solvent is too small, the dispersibility or solubility of the colorant, for instance, tends to be inadequate.

In addition to the above components, the composition of the present invention may be optionally supplemented with various known additives such as the colorant, lubricant, corrosion inhibitor, preservative/antifungal agent, dye solubilizer, surfactant and so on.

Particularly as the colorant, known organic and inorganic pigments and dyes other than said flaky pigment can be selectively formulated in a suitable proportion. As such other pigments, there can be mentioned phthalocyanine, quinacridone, carbon, etc., and as said other dyes, various dies in such series as the triphenylmethane, xanthene, anthraquinone, metal complex, and copper(II) phthalocyanine series can be employed. Aside from these, fluorescent pigments, phosphorescent pigments, colored emulsions, etc. can also be employed.

When an organic or inorganic pigment is used in the present invention, it can be used in the form of a dispersion in water. In this case, for enhancing aqueous dispersibility, a pigment-dispersant resin such as a styrene-acrylic copolymer may be formulated. In addition, where necessary, a pH control agent such as triethanolamine can be added.

The formulating amount of the colorant can be judiciously selected according to the kind of colorant, among other factors, but may for example be about 0.05~10 weight %, preferably 1~10 weight %, based on the total composition of the invention. When said aqueous pigment dispersion is used as the colorant, the formulating calculation should be based on the sum of the amounts of the pigment and dispersant resin used (pigment base).

The composition of the present invention can be produced by blending the above respective components and following the known dispersing procedure. When a water-soluble resin, for instance, is used as the resin component, the production process may comprise mix-dispersing the solvent and flaky pigment, optionally together with the colorant, adding the water-soluble resin to the dispersion, filtering the mixture and degassing the filtrate. When an oil-soluble resin is used as the resin component, the production process may comprise mix-dispersing the solvent and oil-soluble resin, optionally together with the colorant, stirring the mixture under heating at a suitable temperature, returning the resulting solution to room temperature, adding the flaky pigment, filtering the mixture and degassing the filtrate.

2. Writing Utensil

The composition of the present invention can be used in substantially all applications, for example as a printing ink or as the ink component of a writing utensil. The writing utensil includes ball-point pens, markers and so on. Except that the composition of the present invention is used as the ink component, such writing utensils may otherwise have known structures.

3. Scratch Material

The present invention encompasses a scratch material characterized by its comprising a film formed from the composition of the invention on a substrate carrying a character or pattern image expressed thereon and hiding said character or pattern image.

The substrate mentioned above is not particularly restricted inasmuch a film such as described above can be formed thereon, thus including various kinds of paper, wooden/fibrous substrates, resin substrates, metal substrates, ceramic substrates, glass substrates and composite artifacts thereof. In the present invention, paper can be used with advantage. The morphology of the substrate is not particularly restricted but may for example be a sheet or a sphere.

The thickness of said film is not particularly restricted inasmuch as the underlying character or pattern image can be hidden. Usually, the film thickness may be about 5~50 µm. The coating film of the scratch material of the present invention principally comprises the very film formed from the composition of the invention and it is preferable that no other coating film be involved.

The character or pattern image in the present invention includes all expressions such as figures, symbols, pictures, motifs, and so on. Moreover, the character or pattern image may have been hand-written or printed. The printing technology which can be used is not particularly restricted.

The scratch material of the present invention can be produced by a process which may for example comprise applying a character or pattern image on a substrate by printing and, then, coating the printed substrate with the composition of the present invention so as to hide said character or pattern image. The printing technology and coating technology which can be used here are not particularly restricted, either, but may respectively be the one known in the art.

In accordance with the present invention, a scratch ink composition which is very satisfactory in erasability, hiding power and ease of use can be provided.

While the composition of the present invention is capable of hiding the character or pattern image recorded on a substrate more or less completely, the image (coating film) formed with the composition of the invention can be easily removed by scratching or abrading with a fingernail, a coin edge, a rubber eraser or the like to thereby reveal and enables identification of the character or pattern image recorded on the substrate. Thus, with the composition of the present invention, a scratch material with an excellent scratch performance can be manufactured.

Furthermore, the composition of the present invention can be used not only as a printing ink but also as the ink component of a writing utensil. In addition, a scratch effect can be obtained simply by applying the composition on the existing printed matter, so that it can be used personally or at the family level, not being restricted to use in the field of business, with greater convenience than the conventional printing ink.

EXAMPLES

The following working and comparative examples are intended to point out the features and advantages of the present invention in further detail and should by no means be construed as defining the scope of the invention.

Examples 1~12 and Comparative Example 1~5

Inks of the recipes shown in Table 1 were respectively prepared.

TABLE 1

|  |  | Example 1 | Example 2 | Example 3 | Example 4 | Example 5 | Example 6 | Example 7 | Example 8 | Example 9 |
|---|---|---|---|---|---|---|---|---|---|---|
| Flaky pigment | 1 | 10.0 | 10.0 |  |  |  |  | 10.0 | 10.0 | 10.0 |
|  | 2 |  |  | 10.0 | 10.0 |  |  |  |  |  |
|  | 3 |  |  |  |  |  |  |  |  |  |
|  | 4 |  |  |  |  |  |  |  |  |  |
|  | 5 |  |  |  |  | 10.0 | 10.0 |  |  |  |
| Water-soluble resin | 1 | 0.4 | 0.3 |  |  | 0.4 | 0.3 |  |  |  |
|  | 2 |  |  | 0.4 | 0.3 |  |  |  |  |  |
|  | 3 | 3.0 | 3.0 | 3.0 | 3.0 | 3.0 | 3.0 |  |  |  |
| Oil-soluble resin | 1 |  |  |  |  |  |  | 15.0 | 15.0 |  |
|  | 2 |  |  |  |  |  |  |  |  | 15.0 |
|  | 3 |  |  |  |  |  |  |  |  |  |
| Solvent | 1 | 81.4 | 79.5 | 81.4 | 61.5 | 81.4 | 79.5 |  |  |  |
|  | 2 | 5.0 | 5.0 | 5.0 | 5.0 | 5.0 | 5.0 |  |  |  |
|  | 3 |  |  |  |  |  |  | 10.0 | 10.0 | 10.0 |
|  | 4 |  |  |  |  |  |  | 65.0 | 62.0 | 65.0 |
| Colorant | 1 |  | 2.0 |  |  |  | 2.0 |  |  |  |
|  | 2 |  |  |  |  |  |  |  | 3.0 |  |

TABLE 1-continued

|  |  |  |  |  |  |  |  |  |  |
|---|---|---|---|---|---|---|---|---|---|
| Pigment base | 1 |  |  |  | 20.0 |  |  |  |  |
| Preservative/antifungal agent | 1 | 0.1 | 0.1 | 0.1 | 0.1 | 0.1 | 0.1 |  |  |
| Corrosion inhibitor | 1 | 0.1 | 0.1 | 0.1 | 0.1 | 0.1 | 0.1 |  |  |
| Total |  | 100.0 | 100.0 | 100.0 | 100.0 | 100.0 | 100.0 | 100.0 | 100.0 | 100.0 |
| Erasability |  | ○ | ○ | ○ | ○ | ○ | ○ | ○ | ○ | ○ |
| Hiding power |  | ○ | ○ | ○ | ○ | ○ | ○ | ○ | ○ | ○ |

|  |  | Example 10 | Example 11 | Example 12 | Compar. Example 1 | Compar. Example 2 | Compar. Example 3 | Compar. Example 4 | Compar. Example 5 |
|---|---|---|---|---|---|---|---|---|---|
| Flaky pigment | 1 | 10.0 | 10.0 | 10.0 |  |  |  |  |  |
|  | 2 |  |  |  |  |  |  |  |  |
|  | 3 |  |  |  | 10.0 | 10.0 | 10.0 |  |  |
|  | 4 |  |  |  |  |  |  | 10.0 | 10.0 |
|  | 5 |  |  |  |  |  |  |  |  |
| Water-soluble resin | 1 |  |  |  | 0.4 | 0.3 |  |  |  |
|  | 2 |  |  |  |  | 0.3 |  |  |  |
|  | 3 |  |  | 3.0 | 3.0 | 3.0 |  |  |  |
| Oil-soluble resin | 1 |  |  |  |  |  |  |  |  |
|  | 2 | 15.0 |  |  |  |  |  | 15.0 | 15.0 |
|  | 3 |  | 15.0 | 15.0 |  |  |  |  |  |
| Solvent | 1 |  |  |  | 81.4 | 79.5 | 61.5 |  |  |
|  | 2 |  |  |  | 5.0 | 5.0 | 5.0 |  |  |
|  | 3 | 10.0 | 10.0 | 10.0 |  |  |  | 10.0 | 10.0 |
|  | 4 | 62.0 | 65.0 | 62.0 |  |  |  | 65.0 | 62.0 |
| Colorant | 1 |  |  |  |  | 2.0 |  |  |  |
|  | 2 | 3.0 |  | 3.0 |  |  |  |  | 3.0 |
| Pigment base | 1 |  |  |  |  | 20.0 |  |  |  |
| Preservative/antifungal agent | 1 |  |  |  | 0.1 | 0.1 | 0.1 |  |  |
| Corrosion inhibitor | 1 |  |  |  | 0.1 | 0.1 | 0.1 |  |  |
| Total |  | 100.0 | 100.0 | 100.0 | 100.0 | 100.0 | 100.0 | 100.0 | 100.0 |
| Erasability |  | ○ | ○ | ○ | x | x | x | x | x |
| Hiding power |  | ○ | ○ | ○ | ○ | ○ | ○ | ○ | ○ |

When a water-soluble resin was used as the resin component, the solvent and he pigment, optionally together with the colorant, were blended, then the water-soluble resin was added and mixed, and the whole composition was filtered and degassed to provide a water-based scratch ink.

When an oil-soluble resin was used as the resin component, the solvent and the oil-soluble resin were blended and heated with stirring, optionally followed by addition of the colorant and further heating with stirring, and after the mixture was cooled to room temperature, the pigment was formulated to provide an oil-based scratch ink. The particulars of the components listed in Table 1 are as follows.

(1) Pigment (Flaky Pigment)

Flaky pigment 1: Aluminum pigment ("Alpaste WXM5422", Toyo Aluminum Co., the integral fraction of particles not larger than 10 μm: ca 20%, $D_{30}$: ca 20 μm, solids: ca 60–70 wt. %)

Flaky pigment 2: Aluminum pigment ("Alpaste WXM1440", Toyo Aluminum Co., the integral fraction of particles not larger than 10 μm: ca 10% $D_{30}$: ca 30 μm, solids: ca 60–70 wt. %)

Flaky pigment 3: Aluminum pigment ("Alpaste WXM0650", Toyo Aluminum Co., the cumulative distribution of particles not larger than 10 μm: ca 80%, $D_{30}$: ca 7 μm, solids: ca 60–70 wt. %)

Flaky pigment 4: Aluminum pigment ("Alpaste 1230M", Toyo Aluminum Co., the integral fraction of particles not larger than 10 μm: ca 50%, $D_{30}$: ca 10 μm, solids: ca 60–80 wt. %)

Flaky pigment 5: Glass flake pigment (Crystal Color "GF2525-M", Toyo Aluminum Co., the integral fraction of particles not larger than 10 μm: ca 20%, $D_{30}$: ca 25 μm, solids: ca 80–90 wt. %)

The integral fractions (weight % of particles not larger than 10 μm in diameter) mentioned for the above flaky pigments were invariably determined using a laser diffraction particle size analyzer ("SALD-1100", Shimadzu). The thickness of any of the above flaky pigments was about 1/5 of the corresponding $D_{30}$ value.

(2) Resin component

Water-soluble resin 1: Rhamsan gum ("K7C233, Sansho Co.)

Water soluble resin 2: Welan gum ("K1A96", Sansho Co.)

Water-soluble resin 3: PVA ("PVA-204", Kuraray)

Oil-soluble resin 1: Ketonic resin ("Halon 80", Honshu Chemical)

Oil-soluble resin 2: Phenolic resin ("Tamanol 510", Arakawa Chemical)

Oil-soluble resin 3: Xylenic resin (Nikanol HP-100, Mitsubishi Gas)

(3) Solvent

Solvent 1: ion-exchange water

Solvent 2: glycerin (reagent grade)

Solvent 3: ethanol (reagent grade)

Solvent 4: propylene glycol monomethyl ether (reagent grade)

(4) Colorant

Colorant 1: yellow dye ("Yellow 202 (1)", Acid Yellow 73, Aizen)

Colorant 2: yellow dye ("Vali Fast Yellow", azo metal complex, Oriental Chemical)

Colorant 3: yellow pigment ("Seikafast Yellow A-3", azo type, Dainichi Seika)

(5) Pigment Base

The colorant 3 and a pigment dispersant resin (styrene-acrylic copolymer "Joncryl J683", Johnson Polymer, weight average mol. wt. =8000) were blended in a weight ratio of 5:1, followed by addition of triethylamine. The mixture was dispersed in a ball mill and diluted with water to make an aqueous pigment dispersion with a solid content of 10 weight % (the figure in the table represents the sum of the weights of colorant 3 and dispersant resin)

(6) Additives

Preservative/antifungal agent: 1,2-benzoisothiazolin-3-one (Proxel GXL, Hoechst Gosei)

Corrosion inhibitor: benzotriazole (reagent grade)

Lubricant: maleic acid monoamide (reagent grade)

Test Example 1

Writing utensils were fabricated using the ink compositions of the recipes (weight %) shown in Table 1.

In the case of water-based scratch inks, a polypropylene ink housing (cartridge) attached to a stainless steel tip for ball-point pen (ball material: silicon carbide) at one end was filled with the ink for use as the core piece. After the core piece was attached to the pen body, the tail plug was set in position. Finally, the air in the core piece was removed with a centrifugal machine to provide a ball-point pen.

In the case of oil-based scratch inks, the ink chamber of a commercial marker [Sakura Trimming Marker Metallic; SAKURA COLOR PRODUCTS CORPORATION] was filled with the ink to provide a marker.

The writing utensil thus fabricated was tested for erasability and hiding power. Erasability was evaluated by writing on loose-leaf paper with each writing utensil, scratching the impression with a commercial rubber eraser, and visually observing the condition before and after scratching. In Table 1, "○" represents the presence of little residues on loose-leaf paper and resumption of the condition prior to writing, and "×" represents the presence of residues on loose-leaf paper and no presumption of the condition prior to writing. Hiding power was evaluated by writing on the ruled line of a commercial loose-leaf filler (paper) with each writing utensil and visually observing the degree of hiding of the ruled line. In Table 1, "○" represents a sufficient hiding effect (the ruled line not visible), and "×" represents no hiding effect (the ruled line visible).

It will be apparent from Table 1 that the inks according to Examples 1~12 were invariably excellent in erasability and hiding power; in other words, a good scratch performance was obtained.

In contrast, the inks according to Comparative Examples 1~5 wherein the integral fraction of particles not larger than 10 $\mu$m was more than 30% were invariably poor in erasability, causing soiling of the substrate after erasure.

What is claimed is:

1. A scratch ink composition comprising a flaky pigment, a resin component and a solvent, the particles of the pigment having a particle size as determined with a laser diffraction particle size analyzer such that the integral fraction of particles not larger than 10 $\mu$m in diameter is not more than 30%.

2. A scratch ink composition as defined in claim 1 wherein the particles constituting an integral fraction of 30% in the particle size distribution as determined with a laser diffraction particle size analyzer are within the diameter range of 3~200 $\mu$m and that its thickness is 1/40~1/60 of the particle diameter.

3. A scratch ink composition comprising a flaky pigment, a resin component and a solvent, the particles of the pigment having a particle size as determined with a laser diffraction particle size analyzer such that the integral fraction of particles not larger than 10 $\mu$m in diameter is not more than 30%, wherein the resin component comprises at least a microbial secretion polysaccharide or a derivative thereof.

4. A writing utensil comprising the composition according to any of claims 1~3 as its ink component.

5. A ball-point pen or marker comprising the composition according to any of claims 1~3 as its ink component.

6. A scratch material comprising a film formed from the composition defined in any of claim 1~3 on a substrate carrying a character or pattern image, said film hiding said character or pattern image.

7. A method of producing a scratch material which comprises printing a substrate with a character or pattern image and then applying the composition defined in any of claim 1~3 in superimposition to hide said character or pattern image.

8. A scratch ink composition as defined in claim 3, wherein the particles constituting an integral fraction of 30% in the particle size distribution as determined with a laser diffraction particle size analyzer are within the diameter range of 3~200 $\mu$m and that its thickness is 1/40~1/60 of the particle diameter.

9. A writing utensil comprising the composition according to claim 3 as its ink component.

10. A ball-point pen or marker comprising the composition according to claim 3 as its ink component.

11. A scratch material comprising a film formed from the composition defined in claim 3 on a substrate carrying a character or pattern image, said film hiding said character or pattern image.

12. A method of producing a scratch material which comprises printing a substrate with a character or pattern image and then applying the composition defined in claim 3 in superimposition to hide said character or pattern image.

* * * * *